United States Patent [19]
Schlosser et al.

[11] 3,899,913
[45] Aug. 19, 1975

[54] SHEET WRAPPER

[75] Inventors: James A. Schlosser, Essexville; Walter A. Trumbull, Midland, both of Mich.

[73] Assignee: The Dow Chemical Company, Midland, Mich.

[22] Filed: May 10, 1974

[21] Appl. No.: 469,142

[52] U.S. Cl. ............... 72/383; 29/200 B; 29/455; 72/401; 113/8; 113/12; 156/213; 156/215; 156/217; 156/392; 156/443; 156/481
[51] Int. Cl. ............................................. B21d 5/02
[58] Field of Search ........... 156/196, 212, 213, 215, 156/217, 392, 443, 475, 481, 580, 581; 29/475, 430, 431, 180 SS, 505, 200 B, 200 J, 234, 235, 157 R, 33 D, 33 E, 202.5, 455; 113/8, 11 R, 11 A, 120 L, 12; 53/13, 32, 116, 117, 204, 228, 229; 72/389, 383, 401

[56] References Cited
UNITED STATES PATENTS

| | | | |
|---|---|---|---|
| 1,661,569 | 3/1928 | Lange | 113/8 |
| 1,723,737 | 8/1929 | Kruse | 113/8 |
| 2,277,519 | 3/1942 | Laxo | 113/8 |
| 2,695,061 | 11/1954 | Laxo | 113/8 |
| 2,912,398 | 11/1959 | Johnson et al. | 156/443 X |
| 2,941,570 | 6/1960 | Plum | 156/475 X |
| 3,162,895 | 12/1964 | Pusch | 156/443 X |
| 3,192,755 | 7/1965 | Laxo | 113/8 |
| 3,355,919 | 12/1967 | Buttery | 113/8 X |
| 3,407,765 | 10/1968 | Wolfe | 113/8 |

FOREIGN PATENTS OR APPLICATIONS 6,815,396  5/1970  Netherlands ................ 156/443

*Primary Examiner*—C. W. Lanham
*Assistant Examiner*—Joseph A. Walkowski
*Attorney, Agent, or Firm*—Lloyd E. Hessenaur, Jr.

[57] ABSTRACT

A device for wrapping sheet, such as a foam panel, about a tubularly shaped object article, such as pipe sections of a pipeline. The device engages the substantially flat sheet and cams it about the curved pipe body circumference by pivoting yokes so as to cause the sheet to be wrapped about the pipe body. After the sheet is wrapped about the pipe body its free edges are fastened together so that the device can be removed.

13 Claims, 6 Drawing Figures

SHEET WRAPPER

BACKGROUND OF THE INVENTION

It has been found necessary to install substantially rigid but somewhat flexible plastic foam insulation panels or sheets about a wide diameter pipeline. The sheet wrapper had to be simple and sturdy in construction with a minimum of moving parts so that it could be used repeatedly without breakdown, and yet maintain a reasonably high degree of accuracy in properly placing of the insulation panels about sections of the pipeline. To accomplish this the present sheet wrapper was designed such that its weight is utilized to perform the mechanical work of wrapping the insulation panels about pipe sections. The sheet wrapper provides reliability and simple functionality by means of a plurality of yoke assemblies which cover the insulation panels about the pipe circumference. As each insulation panel is wrapped about the pipe it is secured together at its free ends, and the yoke assemblies are removed.

SUMMARY OF THE INVENTION

The sheet wrapper of the present invention comprises a plurality of in-line parallel three-component yoke assemblies with rods to stabilize and connect the yoke arms. Each yoke assembly contains end rocker arms which close in a cam-like fashion about the sheet so as to close it about the pipe circumference. Each yoke assembly comprises rocker arms having shoes, idler wheels, or other mechanisms at each end to move along the surface of the sheet. The inside diameter of each of the rocker arms is approximately the same as the outside diameter of the sheet when it is closed about the pipe circumference. The end rocker arms are centrally pivoted from central yoke arms to perform the cam-like closing function. Upon closing the sheet about the pipe circumference, which can be accomplished by using the mechanical weight of the yoke assemblies, the sheet free ends are secured together and the yoke assemblies can be moved to the next pipe section along the pipeline to repeat the operation.

Yet additional objects and advantages of the present invention are even more apparent when taken in conjunction with the accompanying drawing in which like characters of reference designate corresponding material and parts throughout the several views thereof, in which.

DETAILED DESCRIPTION OF A PREFERRED EMBODIMENT

Figure 1:
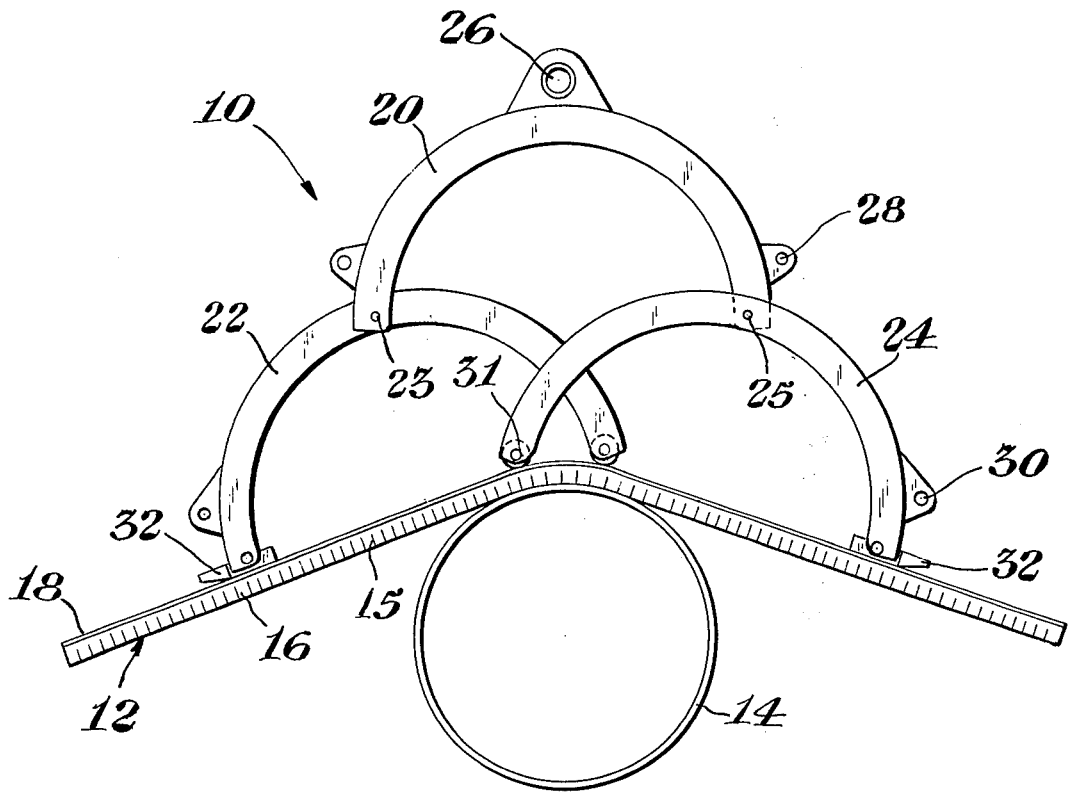
FIG. 1 is a front elevational view of a yoke assembly of a sheet wrapper, according to the invention, prior to closing a sheet about a pipe section.

Sheet wrapper 10 is a mechanical device which can utilize its own weight to perform the function of wrapping a relatively rigid but somewhat flexible panel component or sheet 12 about a relatively wide diameter or pipe section 14. One particular application of the present invention is for wrapping an expanded polystyrene sheet body 16 having a thin aluminum skin about a 4 ft. diameter oil pipeline to insulate the same, as for example might be required in an oil pipeline through the artic areas whereby substantial heat loss from the pipeline should be avoided. This sheet 12 can be a foam panel made of Styrofoam brand expanded polystyrene 15 ft. wide × 24 ft. long × 3½ in. thick. The sheet 12 can be kerfed (slit to partial depth) longitudinally, as by kerfs 15, to facilitate sheet bending about its longitudinal axis. This material is rigid enough, however, to be held along opposite edges along the longitudinal center line without substantial bending and yet, with the kerfing, is flexible enough to be forced around the circumference of a 4 ft. diameter pipe section.

Figure 3:
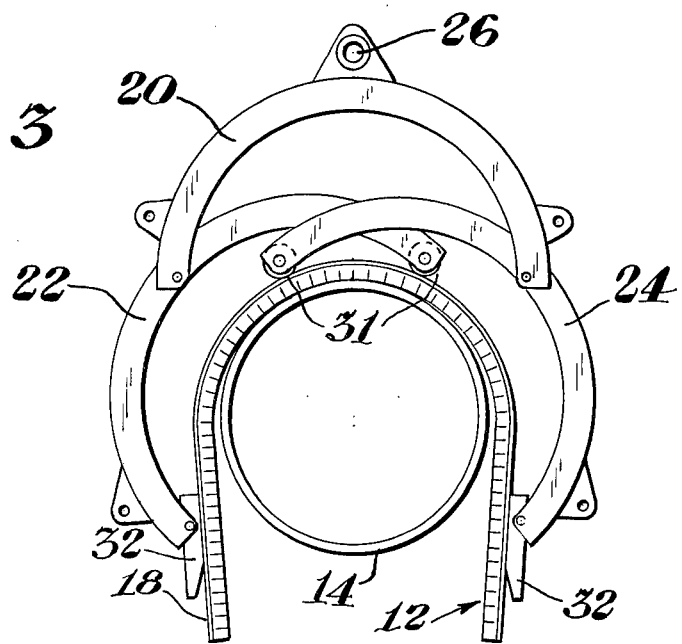
FIG. 3 is a front elevational view like FIG. 1 only showing the yoke assembly in an intermediate closing position.
Figure 4:
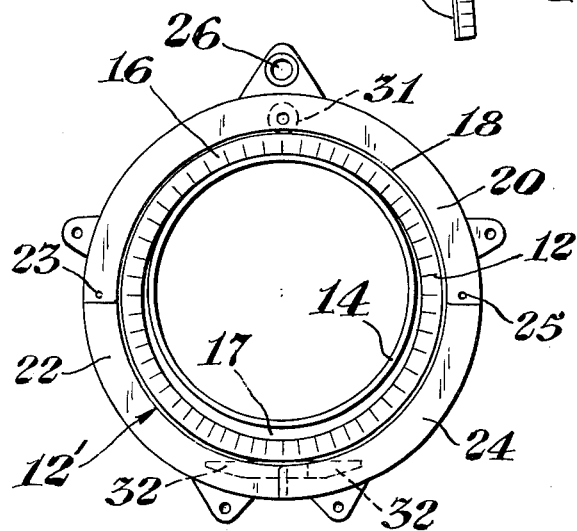
FIG. 4 is a front elevational view like FIG. 1 only showing the yoke assembly engaged about the insulation component in a fully clamped position as it is just about to be removed.
Figure 5:
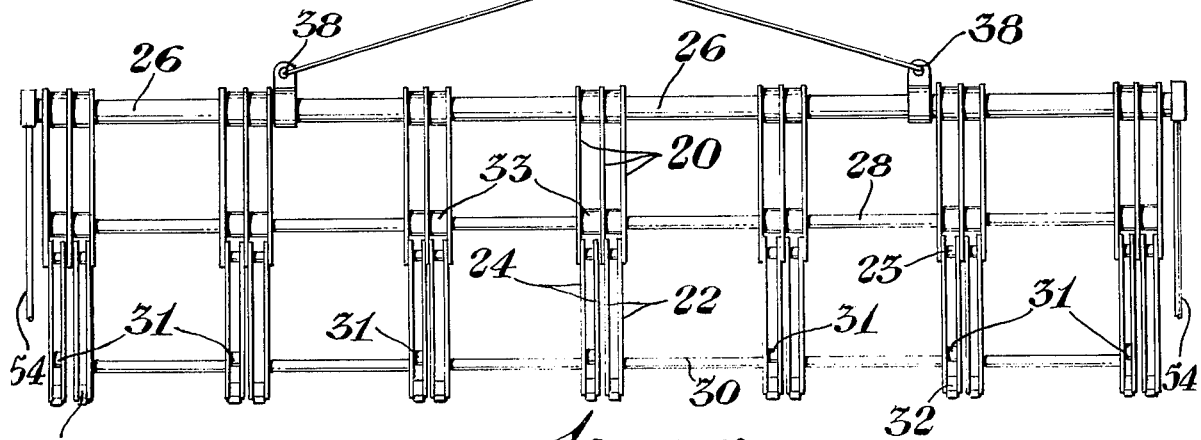
FIG. 5 is an elevational view of the sheet wrapper with its several yoke assemblies connected by a rod to stabilize and operate the same.

The sheet wrapper 10 shown in FIGS. 1 to 5 comprises a plurality of in-line three-component yoke assemblies 19 comprising center yoke arms 20, and yoke-shaped end rocker arms 22 and 24. Each yoke assembly 19 is connected with a main rod 26 and supplementary rods 28 and 30 to maintain the yoke assemblies 19 in parallel relationship to one another along the length of sheet wrapper 10 as shown in FIG. 5. Each yoke assembly 19 comprises, in the embodiment shown, three yoke arms 20, two rocker arms 22, and two rocker arms 24, with appropriate spacers 33 therebetween. Main connecting rod 26 carries center yoke arms 20 and is placed over the center line of the sheet 12 to be wrapped about pipe section 14. Adjustable eye hooks 38 can be located on main connecting rod 26 to obtain lifting of sheet wrapper 10 by a crane hook 39 or other suitable equipment. The eye hooks 38 are adjustable along rod 26 so a balance can always be maintained.

Center yoke arm 20 can be of a semi-circular or crescent shape having an inside diameter substantially the same as the inside diameters of the end rocker arms 22 and 24, which in turn have a diameter which is substantially equal to that of the sheet 12 once it is wrapped about the pipe, in the process of forming a tube 12' of the sheet about the pipe. Each end rocker arm 22 and 24 is centrally pivotted by pins 23 and 25 at the end of center yoke arms 20. At the feet of the rocker arms 22 and 24 can be located a sliding shoe mechanism 32 and/or an idler roll 31, or other like means to permit sliding of each rocker arm along the surface of the sheet. The shoe 32 is designed to slide about the surface of the panel component and can include a polytetrafluoroethylene or other lubricating surface 34 when necessary and other lubrication is not employed. It can be pivotally connected to the rocker arms by means of pins 35 so as to freely follow the contour of the surface of sheet 12.

The particular sheet wrapper 10 shown, when constructed from aluminum, will weigh as much as about 3,500 lbs. Because of such great weight the sheet wrapper, when placed with the sheet 12 on the top of the pipe section 14 the sheet wrapper will, by its own weight, cause the rocker arms 22 and 24 to cam the sheet about the pipe circumference. However, for a particular application, perhaps one using thicker sheet, it may be necessary to use a heavier material in the sheet wrapper, or to drive it, such as by hydraulic pressure, to cause the sheet wrapper to cam the sheet about the pipe section.

The internal diameter of the tubing 12' formed from the wrapped sheet 12 can have a diameter somewhat greater than the outside diameter of pipe section 14 so that when the tubing 12' rests on the pipe, there is a gap 17 between the bottom of the pipe and the tubing 12', as shown in FIG. 4. This gap 17 will permit the sheet tubing 12' to cover small bends in the pipe section without the need to miter the sheet tubing 12'. For example, a pipe section 14 having a 48 inch outside diameter covered by a sheet tubing 12' having an internal diameter of 51 inches can take a bend in the pipe section of up to 5° without requiring mitering.

Figure 6:
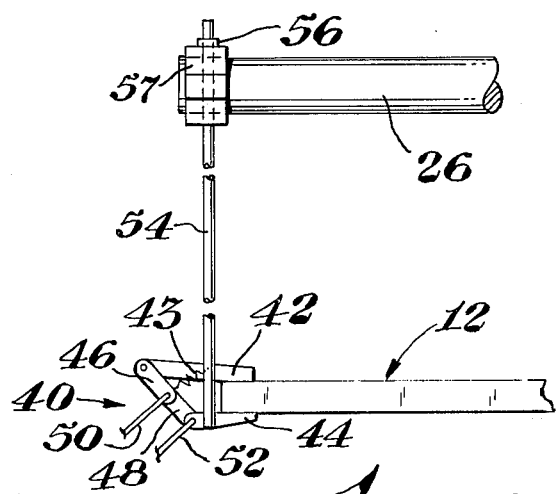
FIG. 6 is a fragmentary elevational view of a sheet clamp mechanism attached to the sheet wrapper to lift the sheet and place it over a pipe section.

If desired, a mechanism for clamping the sheet to the sheet wrapper 10 can be utilized so that the sheet wrapper plus the sheet can be placed about the pipe section in a single operation. Such a mechanism, as lifting clamp 40, is shown in FIG. 6. The lifting clamp 40 of FIG. 5 can be located and secured at the end of connecting rod 26. The lifting clamp 40 is primarily comprised of opposing fingers 42 and 44 which are held together by movable links 46 and 48. When the links are in the position shown in FIG. 6 the sheet 12 is clamped between the fingers 42 and 44. To release the sheet, lines 50 and 52 attached at each end of link 48 are pulled and the fingers open. To clamp the opposite action takes place, or a spring loaded mechanism 43 can be used. The links and fingers are supported by bar 54 which is slidable in collar 57 so that it can rise as the sheet does. Stop nut 56 prevents the bar 54 from dropping through connecting rod 26.

Figure 2:
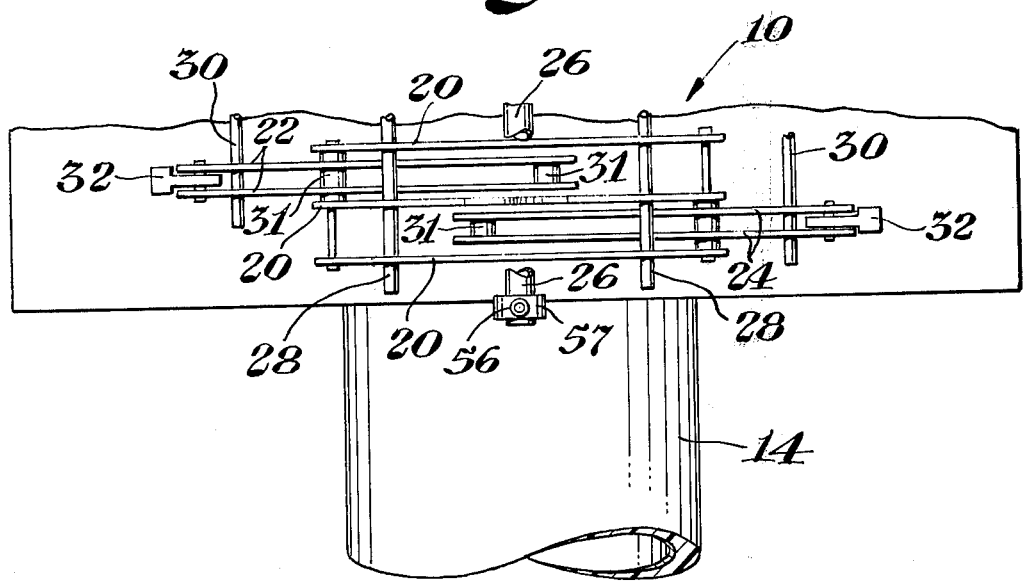
FIG. 2 is a fragmentary plan view of the yoke assembly of FIG. 1.

In operation the sheet wrapper 10 is first directly located over a sheet 12 and when aligned lifting clamps 40 are placed on the edges of the sheet transversing the longitudinal axis of the sheet and actuated. The sheet 12 is then ready to be lifted. When the sheet is located over the pipe and approximately in position, the lifting clamp 40 closest to the pipe section is released by pulling on lines 50 and 52. This will allow one side of the sheet to rest on the pipe section and an operator can then slide it to its position. The other lifting clamp 40 is now released and the sheet wrapper 10 is brought down tightly against the sheet 12 and the sheet 12 against pipe section 14 as shown in FIGS. 1 and 2. As the sheet wrapper 10 comes down on the sheet, its weight forces the sheet down on the pipe section 14 by means of rocker arms 22 and 24, as shown in FIG. 3. The wrapper 10 will continue until the rocker arms 22 and 24 have folded themselves into the center yoke arms 20 and completely around the pipe section as shown in FIG. 4. The sheet is then secured longitudinally by use of staples 60, belts or other mechanisms, and the sheet wrapper 10 removed by pulling up on the crane hook 39, whereby rocker arms 22 and 24 reverse their movement to release the wrapped sheet or sheet tubing 12'.

While certain representative embodiments and details have been shown for the purpose of illustrating the invention, it will be apparent to those skilled in the art that various changes and modifications can be made therein without departing from the spirit and scope of the invention. For example, the principles of the present invention may be applicable to wrapping many various materials around a mandrel (to make tubing) or other tubular elements than a pipe, and may be designed of various sizes depending on the particular size of the article to be wrapped, and may have somewhat different configurations to accommodate other than perfectly round pipes or other articles. The separate items, such as the plate like yoke arms and spacers could instead, for example, be made as thick cast elements thereby eliminating the need for as many separate parts.

Accordingly, what is claimed as new is:

1. A sheet wrapper for wrapping relatively flat sheets about the circumference of an article, said wrapper comprising a multiple component yoke assembly including a central yoke arm and yoke-shaped end rocker arms having center pivots, each of said arms presenting substantially similar inside curvilinear configurations which configurations are about the same as the outside curvilinear configuration of the sheet when wrapped about the article, the central yoke arm supporting adjacent each of its ends a center pivot of one of said rocker arms thereby keeping the same substantially equidistant from the longitudinal centerline of the article.

2. The sheet wrapper of claim 1 wherein said rocker arms have a fixedly spaced relationship from one another as supported from said yoke arm.

3. The sheet wrapper of claim 2 wherein the opposite foot ends of the rocker arms contain bearing means for ease of sliding the rocker arms along the surface of the sheet member as the same is forced about the circumference of the article.

4. The sheet wrapper of claim 3 wherein said bearing means comprises sliding shoes.

5. The sheet wrapper of claim 3 wherein said means comprises idling rollers.

6. The sheet wrapper of claim 3 wherein said sheet when wrapped about said article is closed at its free ends to form a tube.

7. The sheet wrapper of claim 2 wherein a plurality of such yoke assemblies are maintained in a spaced parallel relationship by connecting means.

8. The sheet wrapper of claim 6 wherein the total weight of the sheet wrapper is sufficient to force the rocker arms about the circumference of the article.

9. The sheet wrapper of claim 7 wherein mechanical lifting clamp assembly means is positioned at each end of said connecting means to carry the sheet and then locate the same over the article.

10. The sheet wrapper of claim 1 wherein said article is a large diameter pipe section and said sheet is a foam insulation panel.

11. The sheet wrapper of claim 10 wherein said sheet when closed about said pipe section forms a tube having a larger internal diameter than the outside diameter of the pipe section so certain bends can be tolerated in the pipe section without mitering the sheet tube.

12. The sheet wrapper of claim 11 wherein said sheet is relatively rigid and is kerfed to facilitate bending about the pipe section.

13. The sheet wrapper of claim 12 wherein the sheet has a metal surface engaged by the rocker arms.

* * * * *